(12) United States Patent
Piech et al.

(10) Patent No.: US 8,631,917 B2
(45) Date of Patent: Jan. 21, 2014

(54) ELEVATOR BRAKE WITH MAGNETO-RHEOLOGICAL FLUID

(75) Inventors: Zbigniew Piech, Wolcott, CT (US); Wojciech Szelag, Poznan (PL)

(73) Assignee: Otis Elavator Company, Farmington, CT (US)

( * ) Notice: Subject to any disclaimer, the term of this patent is extended or adjusted under 35 U.S.C. 154(b) by 716 days.

(21) Appl. No.: 12/674,919

(22) PCT Filed: Sep. 7, 2007

(86) PCT No.: PCT/US2007/077850
§ 371 (c)(1),
(2), (4) Date: Feb. 24, 2010

(87) PCT Pub. No.: WO2009/032014
PCT Pub. Date: Mar. 12, 2009

(65) Prior Publication Data
US 2011/0114421 A1 May 19, 2011

(51) Int. Cl.
*F16F 9/53* (2006.01)
(52) U.S. Cl.
USPC .................. 188/267.2; 188/290; 188/161
(58) Field of Classification Search
USPC .................. 188/267, 267.2, 290, 155–164
See application file for complete search history.

(56) References Cited

U.S. PATENT DOCUMENTS

| 5,573,088 | A | 11/1996 | Daniels |
| 6,659,238 | B2 | 12/2003 | Saito et al. |
| 6,854,573 | B2 | 2/2005 | Jolly et al. |
| 2002/0074196 | A1 | 6/2002 | Park |
| 2003/0141155 | A1* | 7/2003 | Daneryd et al. ........... 188/267.1 |
| 2005/0126871 | A1* | 6/2005 | Jolly et al. .................... 188/267 |

FOREIGN PATENT DOCUMENTS

| FR | 1043043 | A | 11/1953 |
| JP | 51-010303 | | 1/1976 |
| JP | 07-133086 | | 5/1995 |
| JP | 2002130342 | | 5/2002 |
| JP | 2003120728 | | 4/2003 |
| JP | 2005-291482 | | 10/2005 |
| WO | WO9705774 | | 2/1997 |
| WO | WO03036120 | | 5/2003 |

OTHER PUBLICATIONS

International Preliminary Report on Patentability dated Mar. 18, 2010.
Search Report and Written Opinion mailed on Jun. 26, 2008 for PCT/US2007/077850.

* cited by examiner

*Primary Examiner* — Melanie Torres Williams
(74) *Attorney, Agent, or Firm* — Carlson, Gaskey & Olds, P.C.

(57) ABSTRACT

An elevator brake assembly includes a braking fluid for providing a braking force. A first magnet provides a first magnetic field that influences the braking fluid to provide the braking force. The second magnet selectively provides a second magnetic field that controls how the first magnetic field influences the braking fluid to control the braking force.

5 Claims, 4 Drawing Sheets

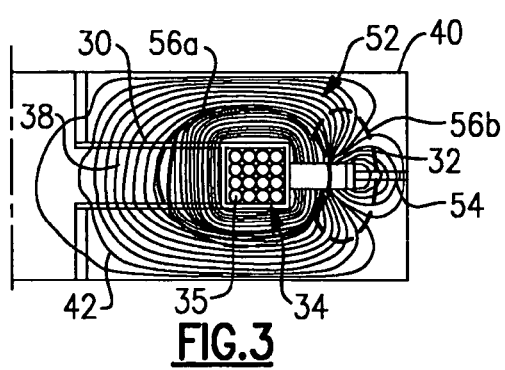
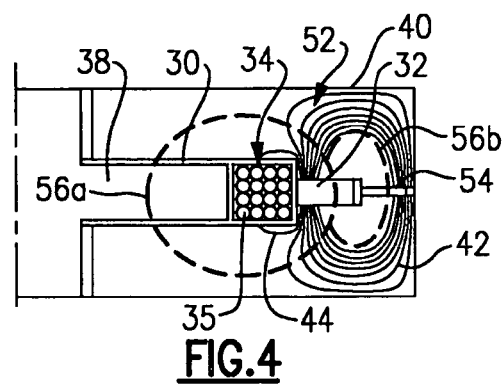
FIG.3
FIG.4
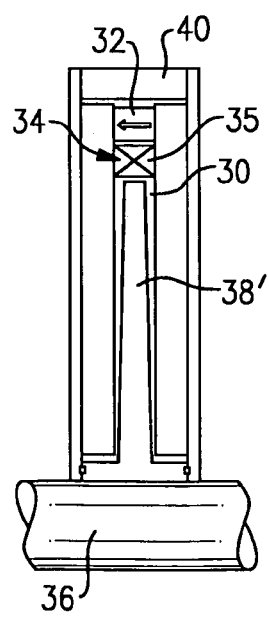
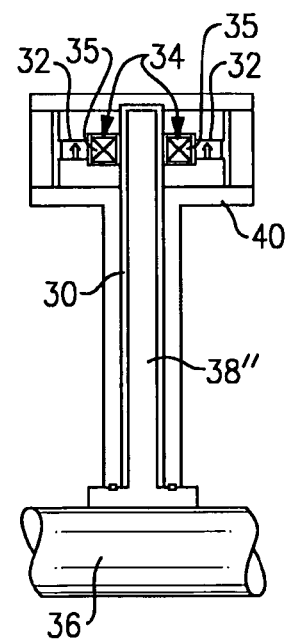
FIG.5
FIG.6

ELEVATOR BRAKE WITH MAGNETO-RHEOLOGICAL FLUID

This application is a United States National Phase application of PCT Application No. PCT/US2007/077850 filed Sep. 7, 2007.

BACKGROUND

This disclosure generally relates to elevator systems. More particularly, this disclosure relates to an elevator braking system.

Elevator systems include a braking system to hold an elevator car in a desired position, such as at a landing. Typically, the elevator system includes an elevator machine that moves the elevator car between landings. Once at a desired landing, the braking system applies a braking force to hold the elevator car at the landing.

The braking system typically includes springs that bias a moveable plate against a brake rotor that rotates with a machine shaft extending from the elevator machine. The brake rotor includes a brake lining. The resulting friction between the brake lining and the moveable plate holds the elevator car, or in some circumstances is used to slow the movement of the elevator car. Engagement between the moveable plate and the brake lining is the default condition. The moveable plate is disengaged from the brake lining by applying a magnetic field using an electromagnet. An attractive force generated by the magnetic field overcomes the bias force of the springs and lifts the moveable plate away from the brake rotor and brake lining to permit the elevator car to move.

Although effective, conventional arrangements that depend on friction may have the drawback that the brake lining is vulnerable to wear. Over time, the brake lining may wear down and cause variation in the amount of braking force applied by the springs. Additionally, the wear may increase the distance between the moveable plate and the electromagnet and require a stronger magnetic field to lift the moveable plate off of the brake lining.

Accordingly, there is a need for a braking system that provides a desired braking force without friction.

SUMMARY

An example elevator brake assembly includes a braking fluid for providing a braking force. A first magnet provides a first magnetic field that influences the braking fluid to provide the braking force. A second magnet selectively provides a second magnetic field that controls how the first magnetic field influences the braking fluid to control the braking force.

In one example, the braking fluid is adjacent a brake member that is rotatable with an elevator machine shaft such that influencing a viscosity of the braking fluid controls rotation of the brake member. For example, the first magnet is a permanent magnet and the second magnet is an electromagnet.

An example method of controlling the elevator brake assembly includes establishing the first magnetic field to influence the braking fluid and provide the braking force, and selectively providing the second magnetic field to control how the first magnetic field influences the braking fluid and thereby control the braking force. For example, the strength or direction of the second magnetic field may be controlled to selectively increase or decrease the braking force.

The various features and advantages of this invention will become apparent to those skilled in the art from the following detailed description of the currently preferred embodiment. The drawings that accompany the detailed description can be briefly described as follows.

BRIEF DESCRIPTION OF THE DRAWINGS

FIG. 3 illustrates magnetic fields of the example brake assembly in one example operational state.

FIG. 4 illustrates magnetic fields of the example brake assembly in another operational state.

FIG. 5 illustrates one example rotor.

FIG. 6 illustrates another example rotor.

DETAILED DESCRIPTION

Figure 1:
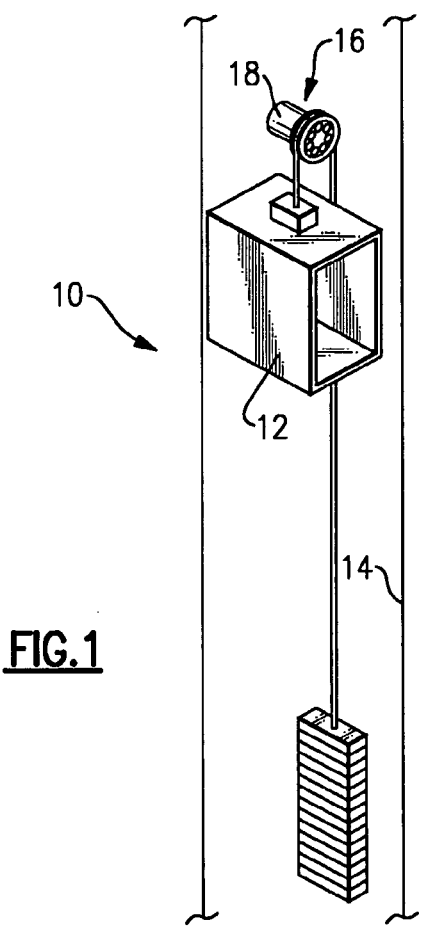
FIG. 1 illustrates an example elevator system having an elevator machine and brake assembly.

FIG. 1 schematically illustrates selected portions of an elevator system 10 including an elevator car 12 that is moveable within a hoistway 14. An elevator machine 16, such as a gearless machine in one example, moves the elevator car 12 in a known manner. A brake assembly 18 is mounted adjacent the elevator machine 16 for holding the elevator car 12 at a desired position within the hoistway 14, or in some circumstances slowing movement of the elevator car 12. Given this description, one of ordinary skill in the art will recognize that the disclosed example configuration may be varied from the illustrated example.

Figure 2:
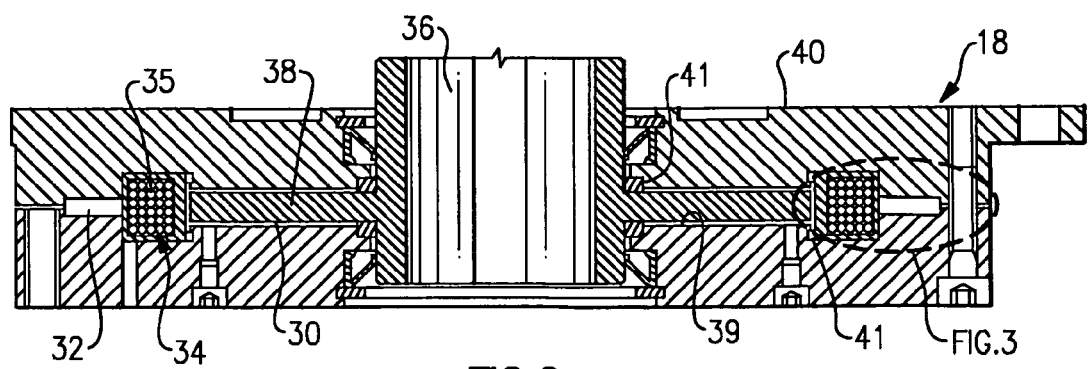
FIG. 2 illustrates one example of the brake assembly.

FIG. 2 is a cross-section illustrating selected portions of an example of the brake assembly 18. In this example, the brake assembly 18 includes a braking fluid 30 for providing a braking force, a first magnet 32 that provides a first magnetic field, and a second magnet 34 that selectively provides a second magnetic field. The second magnet 34 in this example is an electromagnet that is formed by a coil 35 and a brake housing 40. The first magnetic field influences the braking fluid 30 to provide the braking force. The second magnet 34 is selectively activated to generate the second magnetic field that controls how the first magnetic field influences the braking fluid 30 to thereby magnetically control the braking force, such as to increase or decrease the braking force.

In the illustrated example, the first magnet 32 and the second magnet 34 provide a reverse braking arrangement such that electric current must be applied to the coil 35 to release the braking force. In this regard, the brake assembly 18 provides the braking force by default and must be activated to release the braking force. Other braking arrangements are also possible.

In this example, the brake assembly 18 cooperates with an elevator machine shaft 36 that extends into the brake assembly 18 from the elevator machine 16. A rotor 38 is coupled to the elevator machine shaft 36 in a known manner, such as by using a splined connection. The rotor 38 extends radially outwards from the elevator machine shaft 36 within a cavity 39 in the brake housing 40. There is a clearance between the rotor 38 and the walls of the cavity 39 such that the rotor 38 can rotate with the elevator machine shaft 36. The braking fluid 30 is located within the clearance space between the rotor 38 and the walls of the cavity 39. The amount of the braking fluid 30 may be varied. In one example, the braking fluid 30 does not completely fill the clearance space within the cavity 39.

In the illustrated example, seals 41 are used between the rotor 38 and the elevator machine shaft 36 and between the rotor 38 and the housing 40 to prevent the braking fluid 30 from leaking out of the cavity 39.

The braking fluid 30 is a magneto-rheological fluid having a viscosity that varies in response to the magnetic fields provided by the first magnet 32 and the second magnet 34. Thus, the magnetic fields can be controlled to control the viscosity of the braking fluid 30 and thereby control the braking force applied to the rotor 38. The braking fluid 30 transmits torque between the brake housing 40 and the rotor 38 to magnetically resist rotation, rather than relying on friction as in previously known brake assemblies.

In the disclosed example, the magneto-rheological fluid is a suspension of magnetic particles in a fluid, such as synthetic oil. In one example, the magneto-rheological fluid is 85 wt % magnetic particles and 15 wt % fluid. In other examples, the composition may be different, depending on the desired viscosity and response to the magnetic fields. Under the influence of a magnetic field, the magnetic particles orient into chains that increase the viscosity of the magneto-rheological fluid. In the absence of the magnetic field, the particles disorient, and the viscosity of the magneto-rheological fluid decreases. The viscosity is proportional to the strength of the magnetic field.

Optionally, to prevent interaction between the magnetic particles that can cause particle agglomeration, the particles may be coated with a known surface active agent. In some examples, the change in viscosity occurs in microseconds, and the magneto-rheological fluid becomes nearly solid if the magnetic field is strong. For example, a magnetic field of about 200-300 kA/m solidifies the magneto-rheological fluid. In one example, the first magnetic field is of suitable strength to solidify the braking fluid 30. In a further example, the solidified braking fluid 30 provides the benefit of sustaining the braking force without creeping because the magnetic field maintains a shear modulus transmitted through the oriented, magnetically locked magnetic particle chains.

In the disclosed example, the first magnet 32 is a permanent magnet and the second magnet 34 is an electromagnet that selectively provides the second magnetic field, depending upon an amount of electric current applied to the coil 35. When the second magnet 34 is de-energized (i.e., no electric current), the first magnetic field penetrates the braking fluid 30. The first magnetic field magnetically aligns the particles within the braking fluid 30 to increase the viscosity of the braking fluid 30 and thereby magnetically resist rotation of the rotor 38.

To release the braking force provided by the braking fluid 30, the coil 35 of the second magnet 34 is energized to provide the second magnetic field. The second magnetic field magnetically shifts the first magnetic field such that the penetration of the first magnetic field through the braking fluid 30 decreases, and in some example decreases to zero. The decrease in penetration (i.e., flux) decreases the viscosity of the braking fluid 30 to reduce the braking force. In one example, when the viscosity of the braking fluid 30 is decreased, the rotor 38 rotates relatively freely in the braking fluid 30 with insignificant friction loss. For example, the friction loss may be about 1%-3% of the rated torque of the brake assembly 18.

FIG. 3 illustrates a portion of the brake assembly 18 in a first operational state showing magnetic field lines 42 that represent the first magnetic field provided by the first magnet 32. In this example, the coil 35 is de-energized such that there is no electric current through the coil 35 and the second magnetic field is zero. The magnetic field lines 42 penetrate the braking fluid 30 in this state such that the braking fluid is solidified to provide the braking force on the rotor 38. Solidified fluid basically locks the rotor 38 to the housing 40 because cavity 39 no longer provides clearance between them. Further, no friction is used to apply the braking force because the braking fluid 30 hardens through magnetic locking of the particles within the braking fluid 30.

FIG. 4 illustrates the portion of the brake assembly 18 in a second operational state. The coil 35 is now energized with a predetermined amount of electric current. The second magnet 34 responsively provides the second magnetic field represented by magnetic field lines 44. The second magnetic field magnetically shifts the first magnetic field such that the first magnetic field is effectively pushed away from the braking fluid 30. In the absence of the influence of the first magnetic field, the braking fluid 30 decreases in viscosity from magnetic unlocking of the particles within the braking fluid 30, thereby permitting the rotor 38 to rotate. Thus, controlling the strength of the second magnetic field provided by the second magnet 34 controls how the first magnetic field influences the braking fluid 30 (e.g., alters the viscosity) to control the braking force.

Using the coil 35 of the second magnet 34 to magnetically shift the first magnetic field to control the braking force allows the brake assembly 18 to be lighter and more compact than previously known assemblies. Additionally, if the coil 35 of the second magnet 34 were to magnetically oppose the first magnetic field rather than magnetically shift the first magnetic field, a much larger coil may be required to produce a magnetic field of suitable strength for opposing. Thus, magnetic opposition may be employed, but there may be an increase in size and weight.

In the examples shown in FIGS. 3 and 4, the first magnetic field is transmitted through a magnetic circuit 52. In the disclosed example, the housing 40, the rotor 38, the braking fluid 30, and a non-ferromagnetic interruption 54 provide portions of the magnetic circuit 52. For example, the housing 40 and the rotor 38 include a ferromagnetic material that is suitable for magnetic field transmission, such as steel. Given this description, one of ordinary skill in the art will be able to select materials, such as iron based materials, that are suitable for forming the magnetic circuit 52.

In the illustrated example, the magnetic circuit 52 includes a first circuit loop 56a that forms a continuous magnetic path through the brake housing 40, the braking fluid 30, and the rotor 38 that circumscribes the first magnet 32. When the coil 35 is deenergized, the magnetic circuit 52 transmits the first magnetic field through the first circuit loop 56a without interruption (e.g., FIG. 3). However, when the coil 35 is energized, the second magnetic field 44 magnetically shifts, or pushes, the first magnetic field 42 to a second circuit loop 56b (e.g., FIG. 4) of the magnetic circuit 52. The second circuit loop 56b is non-continuous and is formed by the brake housing 40 and a non-ferromagnetic interruption 54.

In the disclosed example, the non-ferromagnetic interruption 54 is a gap in the brake housing 40, such as an air gap that is not as well suited for transmitting magnetic fields (relative to the material of the brake housing 40). If the size of a non-ferromagnetic interruption 54 is large, a stronger second magnetic field is required to magnetically shift the first magnetic field to the second circuit loop 56b. That is, the first magnetic field transmits through a path of least magnetic resistance, which can be controlled by selecting a size of the non-ferromagnetic interruption 54 during a design stage of the brake assembly 18. Thus, decreasing the size of a non-ferromagnetic interruption 54 may require a lower strength of the second magnetic field to shift the first magnetic field, and vice versa.

In the examples illustrated above, the nominal thickness of the rotor 38 is uniform throughout the radial span of the rotor 38. However, as illustrated in the example shown in FIG. 5, a rotor 38' having, a different shape and a different surface area may be used to provide a different braking force. The rotor 38' includes a thickness that decreases (i.e., tapers) along a radial direction relative to the elevator machine shaft 36. In this example, the rotor 38' is thinnest near the edge that is furthest from the elevator machine shaft 36. The tapered profile of the rotor 38' provides a surface area that is different than a surface area of the uniform thickness rotor 38 shown in the previous examples. For a given magnetic field strength, the amount of braking force is approximately proportional to the amount of surface area that the braking fluid 30 acts upon to provide the braking force. The rotor 38' thereby provides a different amount of braking force than the rotor 38 of the previous examples.

FIG. 6 is another variation illustrating a rotor 38" having a larger radial diameter than the rotors 38 or 38' of the previous examples. Thus, the rotor 38" provides an even greater surface area for the braking fluid 30 to act upon and a corresponding increased amount of braking force. Additionally, because of the larger size of the rotor 38" and greater amount of braking fluid 30, multiple sets of first magnets 32 and second magnets 34 are used. In the illustrated example, one of the first magnets 32 and one of the second magnets 34 are disposed on each side of the rotor 38", and each set of the magnets 32 and 34 operates similarly to those described for FIGS. 3 and 4.

Figure 7:
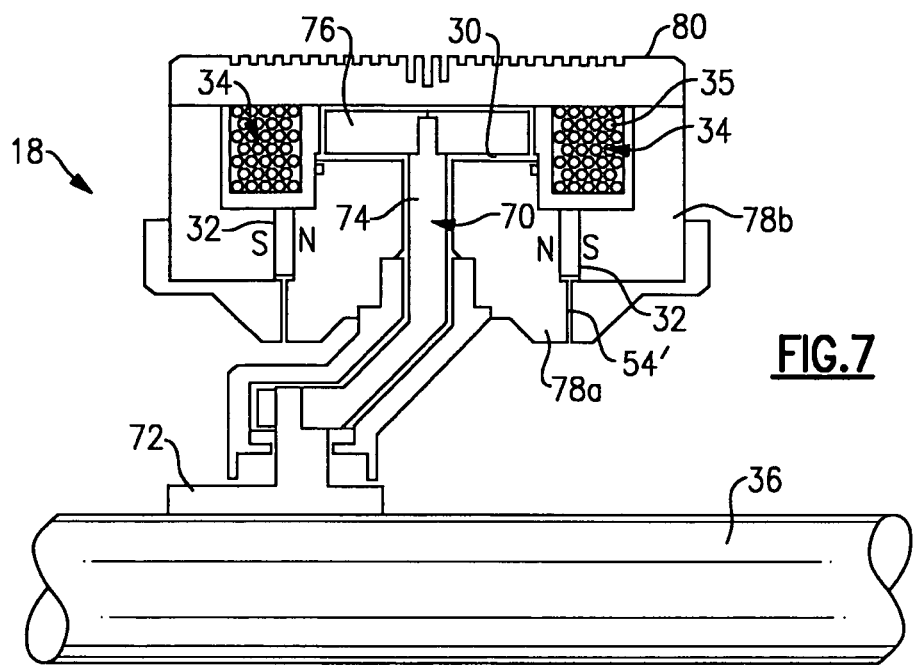
FIG. 7 illustrates another example rotor and brake assembly.
Figure 8:
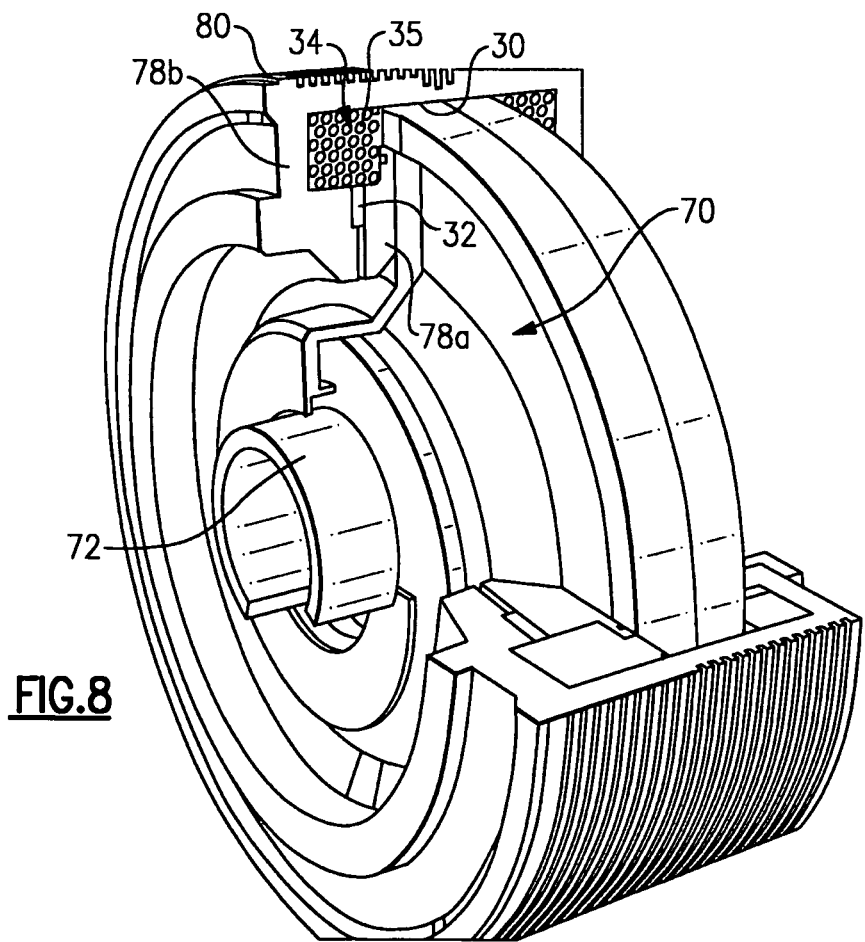
FIG. 8 illustrates a cutaway view of the example variation shown in FIG. 7.

FIG. 7 and FIG. 8 illustrate a variation of the brake assembly 18 having a rotor 70 that extends radially outwards from the elevator machine shaft 36. In this example, the rotor 70 includes a sleeve 72 that is connected for rotation with the elevator machine shaft 36 in a known manner, such as using a splined connection. The sleeve 72 is coupled with a disk 74 that extends radially outwards relative to the elevator machine shaft 36. A drum 76 is coupled with an outer end of the disk 74 and extends in an axial direction relative to the elevator machine shaft 36 (i.e., parallel with the shaft axis). In this example, the disk 74 is non-ferromagnetic, and the drum 76 is ferromagnetic.

At least one first magnet 32 and one second magnet 34 are located on each side of the rotor 70. Each of the first magnets 32 is disposed between ferromagnetic elements 78a and 78b that form a magnetic circuit with a ferromagnetic element 80, the drum 76, and the braking fluid 30 to operate in a manner as described above. In this example, the ferromagnetic elements 78a and 78b are separated by a non-ferromagnetic interruption 54', such as an air gap as described above. When the coils 35 are deactivated, the first magnetic field provided by the first magnets 32 is transmitted through the ferromagnetic elements 78a and 78b, the ferromagnetic element 80, the drum 76, and the braking fluid 30 to provide a braking force on the rotor 70. The drum 76 provides the benefit of a desirable amount of surface area for providing a desired braking force.

When the coils 35 are activated, the second magnetic field provided by the second magnets 34 magnetically shifts the first magnet field provided by the first magnets 32 to reduce the penetration of the first magnetic field (i.e., flux) through the braking fluid 30 and thereby decrease the braking force. The portion of the braking fluid 30 that is adjacent the disk 74 (non-ferromagnetic) does not significantly change in viscosity because the non-ferromagnetic disk 74 does not transmit magnetic fields.

Figure 9:
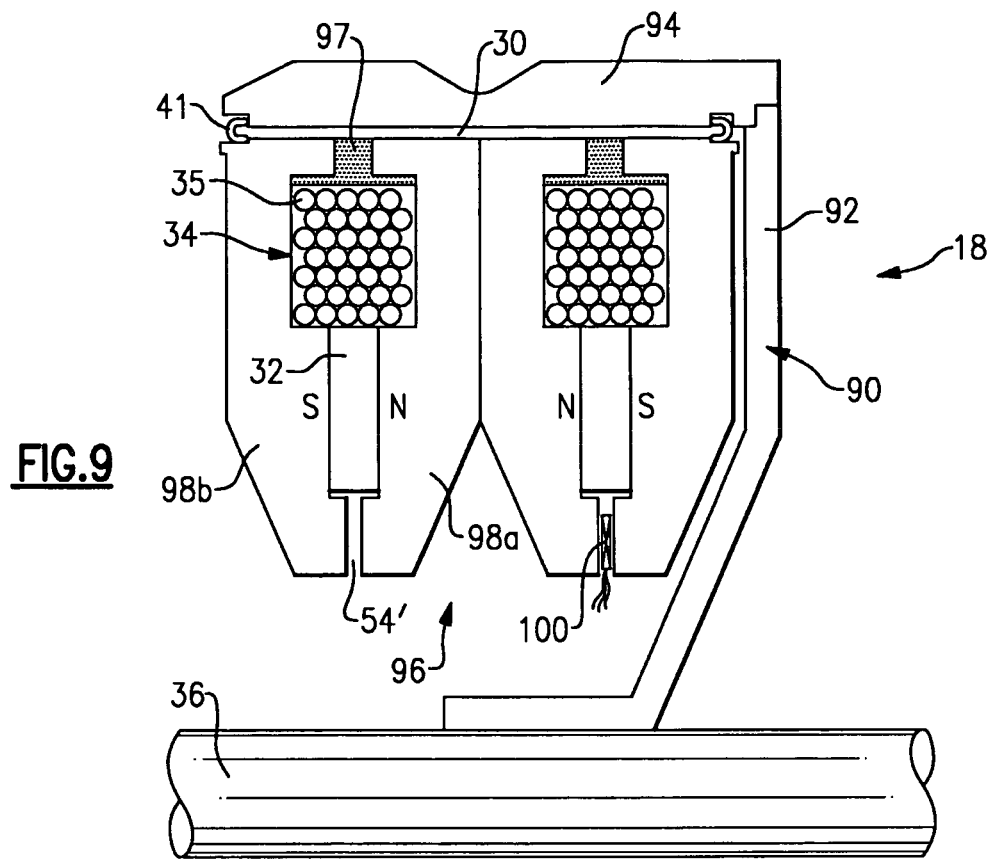
FIG. 9 illustrates another example rotor and brake assembly.

FIG. 9 illustrates another variation of the brake assembly 18 having a rotor 90 that extends radially outwards from the elevator machine shaft 36. In this example, the rotor 90 is connected for rotation with the elevator machine shaft 36 in a known manner, such as using a splined connection. The rotor 90 includes a disk 92 that extends radially outwards relative to the elevator machine shaft 36. A drum 94 is coupled with an outer end of the disk 92 and extends in an axial direction relative to the elevator machine shaft 36 (i.e., parallel with the shaft axis). In this example, the drum 94 is ferromagnetic and the disk 92 is paramagnetic to limit parasitic magnetic flux.

The brake assembly 18 includes a plurality of modules 96 that are modularly assembled to form the brake assembly 18. The braking fluid 30 is located between the drum 94 and the modules 96. The number of modules 96 used may vary from a single module 96 to many modules 96, depending on a desired amount of braking force. The modules 96 are secured radially inwards of the drum 94 in a stationary position relative to the rotor 90, which rotates with the elevator machine shaft 36. Each module 96 includes one of the first magnets 32 and one of the second magnets 34 having the coil 35 encapsulated in a potting material 97. The first magnet 32 is disposed between ferromagnetic elements 98a and 98b, which form a magnetic circuit with the drum 94 and the braking fluid 30 to operate in a manner as described above. The ferromagnetic elements 98a and 98b are separated by a non-ferromagnetic interruption 54', similar to as described above.

In the illustrated example, the north poles of the first magnets 32 are adjacently oriented. Alternatively, the south poles may be adjacently oriented. Any additional modules 96 may also be oriented accordingly, with like poles adjacently oriented with the first magnets 32 of neighboring modules 96.

When the coils 35 are deactivated, the first magnetic field provided by the first magnets 32 is transmitted over a magnetic circuit loop through the ferromagnetic elements 98a and 98b, the drum 94, and the braking fluid 30 to provide a braking force on the rotor 90. The drum 94 provides the benefit of a desirable amount of surface area for providing a desired braking force. When the coils 35 are activated, the second magnetic field provided by the coils 35 of the second magnets 34 magnetically shifts the first magnet field provided by the first magnets 32 to reduce the penetration of the first magnetic field (i.e., flux) through the braking fluid 30 and thereby decrease the braking force, similar to as described above.

Optionally, a sensor 100 (e.g., a Hall sensor) may be mounted at least partially within the non-ferromagnetic interruption 54' in this example or any of the above examples and connected with an elevator controller to detect whether the first magnetic field is present. If the first magnetic field is present, the brake assembly 18 is in a released state such that the rotor 90 is permitted to rotate. If the first magnetic field is not present, the brake assembly 18 is in a holding state such that the rotor 90 is magnetically locked to prevent or limit rotation.

Figure 10:
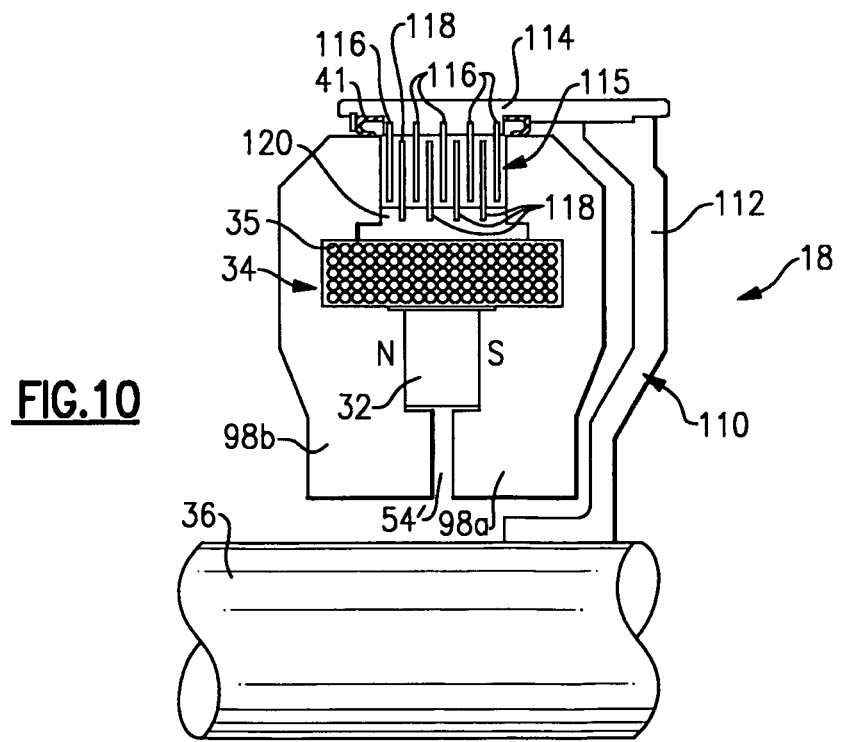
FIG. 10 illustrates another example rotor and brake assembly.

FIG. 10 illustrates another variation of the brake assembly 18 having a rotor 110 that extends radially outwards from the elevator machine shaft 36. In this example, the rotor 110 is connected for rotation with the elevator machine shaft 36 in a known manner, such as using a splined connection. The rotor 110 includes a disk 112 that extends radially outwards relative to the elevator machine shaft 36. A drum 114 is coupled with an outer end of the disk 112 and extends in an axial direction relative to the elevator machine shaft 36 (i.e., parallel with the shaft axis). In this example, the drum 114 is non-ferromagnetic and the disk 112 is paramagnetic to limit parasitic magnetic flux.

A plurality of axially spaced ferromagnetic drum rings 116 extend radially inwards from the drum 114 within a cavity 115. The drum rings 116 corotate with the drum 114 and disk 112. A corresponding plurality of axially spaced ferromagnetic magnet rings 118 extend radially outwards from the second magnet 34 and are interdigitated with the ferromagnetic drum rings 116 to form a labyrinth therebetween. A holder 120, such as a bracket, potting material or other suitable securement, may be used to secure the ferromagnetic magnet rings 118 to the second magnet 34. Thus, the drum rings 116 rotate relative to the stationary magnet rings 118. The braking fluid 30 is contained within the cavity 115 using the seals 41 and fills the labyrinth between the drum rings 116 and the magnet rings 118.

The first magnet 32 is disposed between ferromagnetic elements 98a and 98b, which form a magnetic circuit with the drum rings 116, the magnet rings 118, and the braking fluid 30 to operate in a manner as described above. The ferromagnetic elements 98a and 98b are separated by a non-ferromagnetic interruption 54', similar to as described above.

When the coils 35 are deactivated, the first magnetic field provided by the first magnets 32 is transmitted over a magnetic circuit loop through the ferromagnetic elements 98a and 98b, the drum rings 116, the magnet rings 118, and the braking fluid 30 to provide a braking force on the rotor 110. The rings 116 and 118 provide the benefit of a desirable amount of surface area in a compact space for providing a desired braking force. When the coil 35 is activated, the second magnetic field provided by the coil 35 of the second magnet 34 magnetically shifts the first magnetic field provided by the first magnet 32 to reduce the penetration of the first magnetic field (i.e., flux) through the braking fluid 30 and thereby decrease the braking force, similar to as described above.

Alternatively, the direction of the electrical current provided to the coil(s) 35 in any of the above examples may be reversed to change the direction of the second magnetic field such that the second magnetic field magnetically combines with the first magnetic field to influence the braking fluid 30. That is, the influence of the first magnetic field on the viscosity of the braking fluid 30 may be further increased to increase the braking force. For example, the additional braking force that can be provided by controlling the current through the second magnet 34 in this manner may be used to resist movement of the elevator car 12, such as stopping the car 12 under emergency braking circumstances. In some examples, the first magnet 32 is selected to provide the first magnetic field at a strength sufficient to apply a braking force under normal operating conditions. Adding the magnetic field influence (e.g. flux penetration) of the second magnetic field allows for such examples to also be used as an emergency brake in situations where an increased braking force is desired.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An elevator brake assembly comprising:
    a brake member for rotation with an elevator machine shaft, the brake member including a rotor extending in a radial direction relative to the elevator machine shaft, the rotor including a drum extending axially from the rotor;
    a braking fluid adjacent the brake member and in contact with the drum;
    a permanent magnet for providing a first magnetic field that influences the braking fluid to provide a braking force on the brake member; and
    an electromagnet for selectively providing a second magnetic field that controls how the first magnetic field influences the braking fluid to control the braking force on the brake member.

2. The brake assembly as recited in claim 1, further including at least one ferromagnetic drum ring that extends radially inwards from the drum relative to the elevator machine shaft.

3. The brake assembly as recited in claim 2, further including at least one ferromagnetic magnet ring that extends radially outwards from the electromagnet relative to the elevator machine shaft.

4. The brake assembly as recited in claim 1, wherein the rotor comprises a non-ferromagnetic material and the flange comprises a ferromagnetic material.

5. The brake assembly as recited in claim 1, wherein the electromagnet is located between the brake member and the permanent magnet.

* * * * *

UNITED STATES PATENT AND TRADEMARK OFFICE
CERTIFICATE OF CORRECTION

PATENT NO.         : 8,631,917 B2                                          Page 1 of 1
APPLICATION NO.    : 12/674919
DATED              : January 21, 2014
INVENTOR(S)        : Piech et al.

It is certified that error appears in the above-identified patent and that said Letters Patent is hereby corrected as shown below:

ON THE TITLE PAGE:

Item (73) Assignee: should read as --Otis Elevator Company, Farmington, CT (US)--

IN THE CLAIMS

Claim 4, column 8, line 44: delete "the flange comprises"

Signed and Sealed this
Thirteenth Day of May, 2014

Michelle K. Lee
*Deputy Director of the United States Patent and Trademark Office*